R. E. RODGERS AND T. C. JACKSON.
APPARATUS FOR LAYING ROADBEDS.
APPLICATION FILED APR. 14, 1919.
1,339,069.
Patented May 4, 1920.
5 SHEETS—SHEET 4.
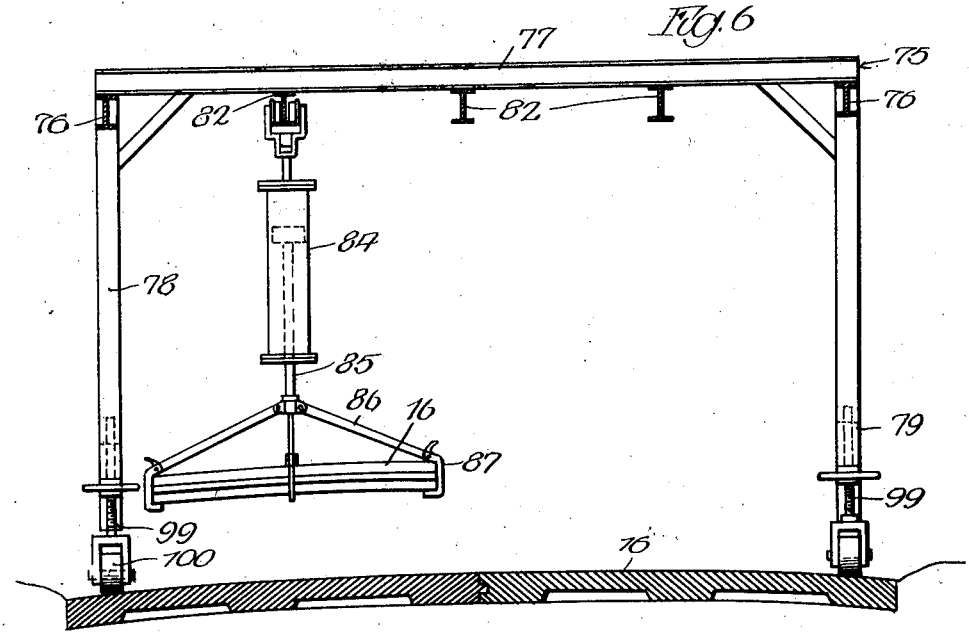
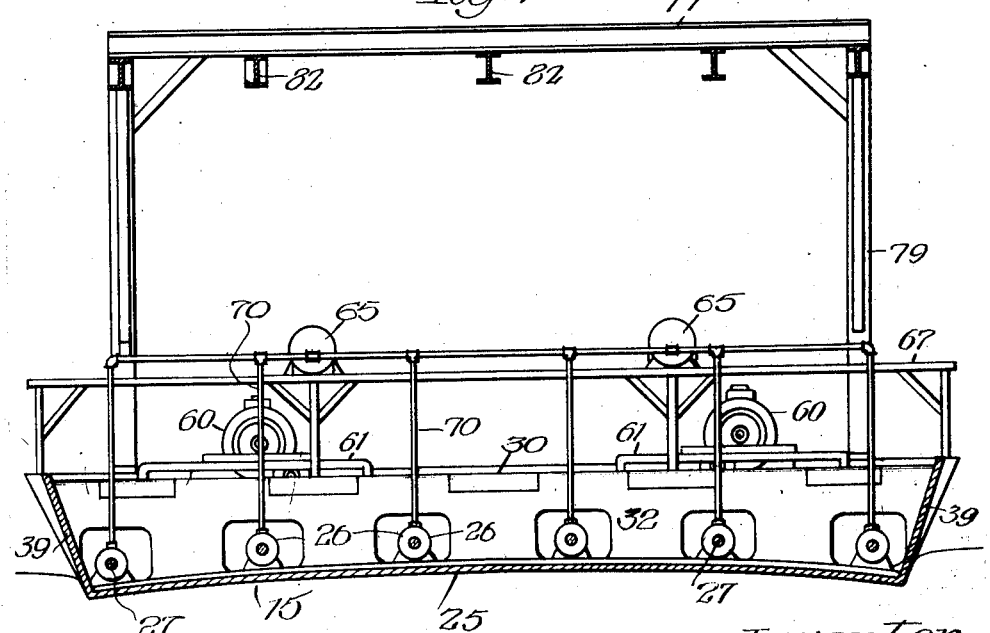

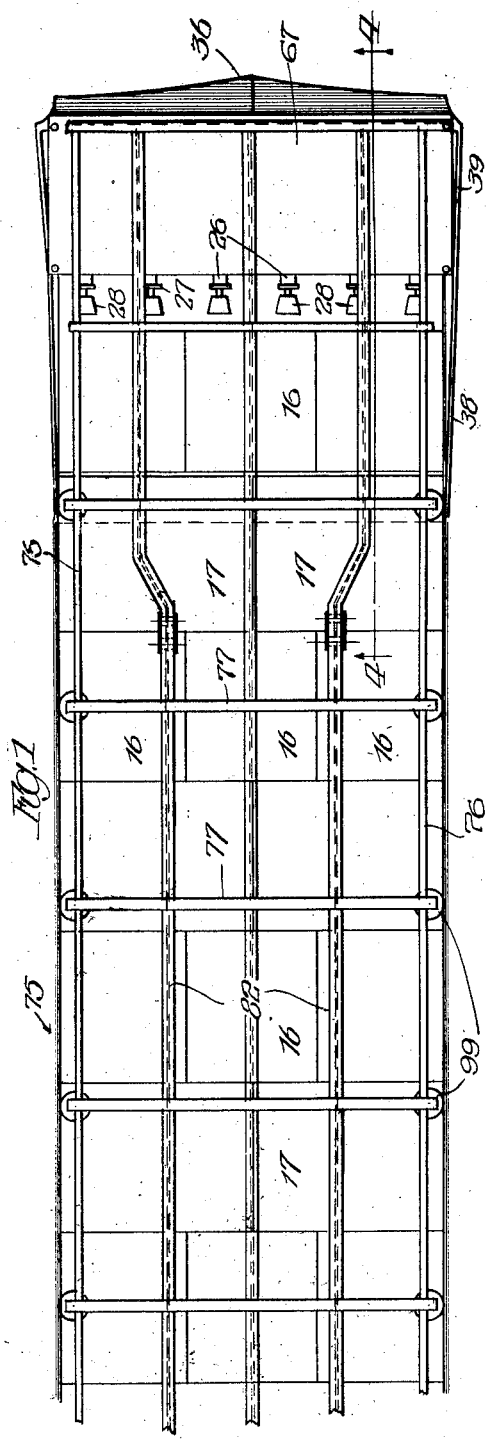

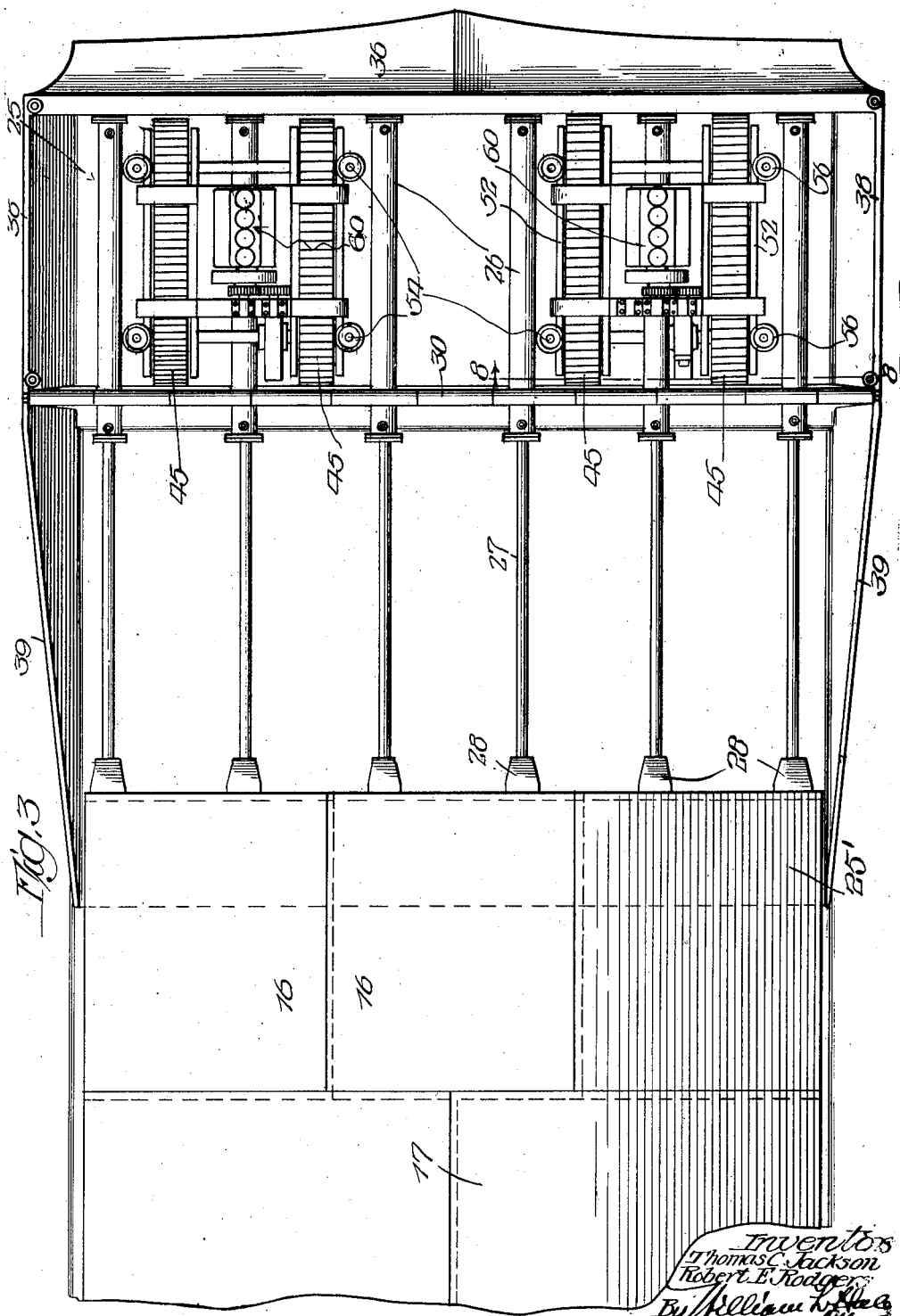

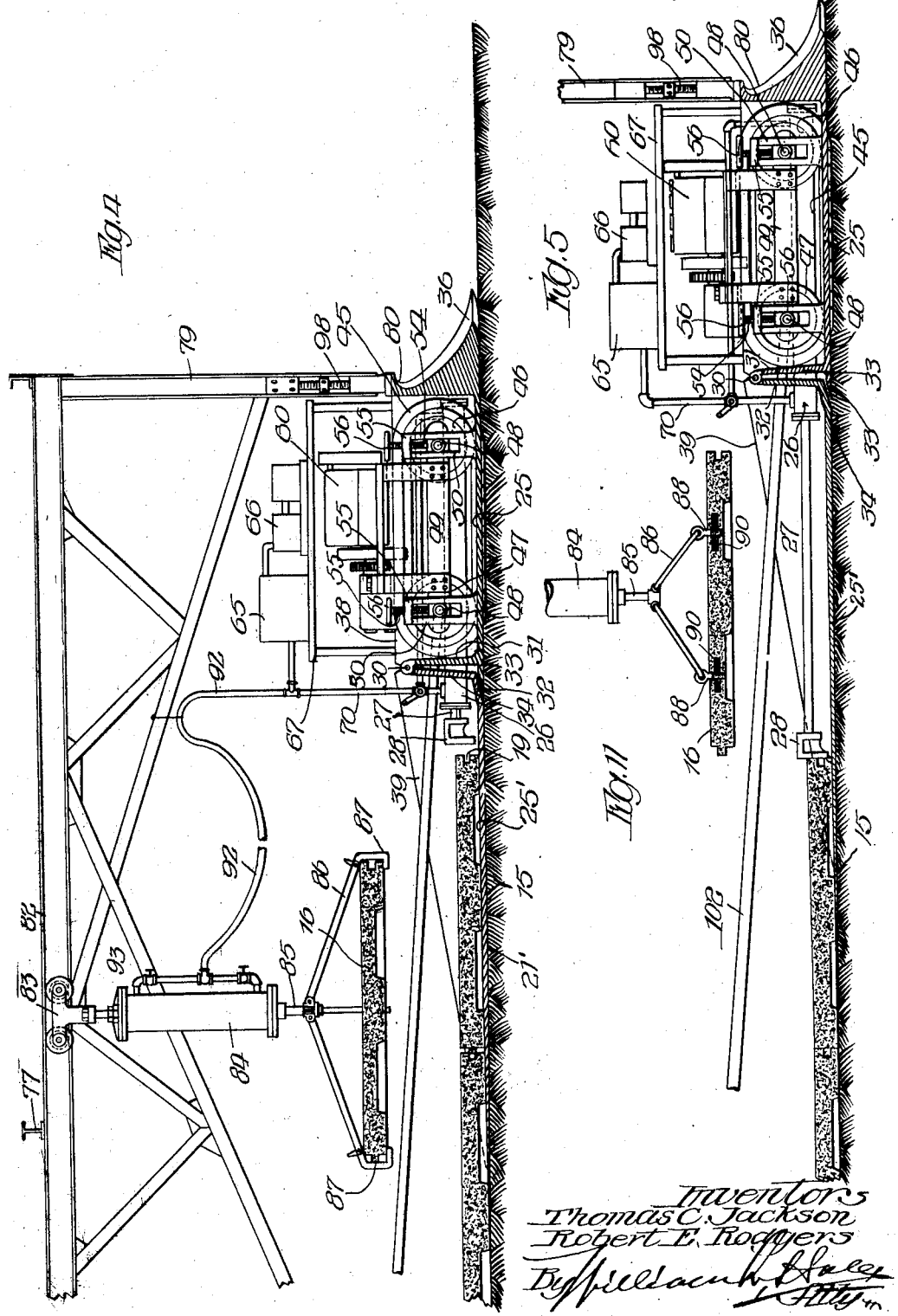

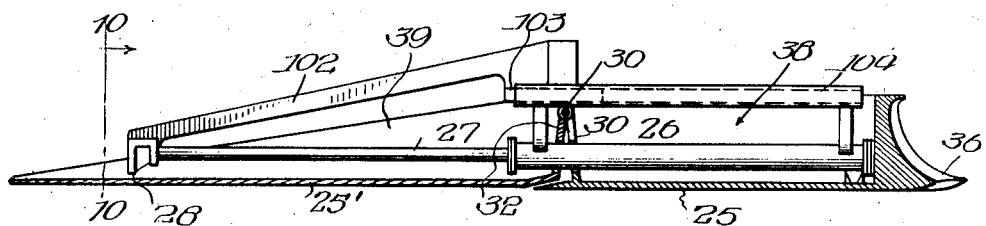

UNITED STATES PATENT OFFICE.

ROBERT E. RODGERS AND THOMAS C. JACKSON, OF CHICAGO, ILLINOIS.

APPARATUS FOR LAYING ROADBEDS.

1,339,069.  Specification of Letters Patent.  Patented May 4, 1920.

Application filed April 14, 1919. Serial No. 290,048.

*To all whom it may concern:*

Be it known that we, ROBERT E. RODGERS and THOMAS C. JACKSON, citizens of the United States, and residents of Chicago, in the county of Cook and State of Illinois, have invented certain new and useful Improvements in Apparatus for Laying Roadbeds; and we do hereby declare that the following is a full, clear, and exact description thereof, reference being had to the accompanying drawings, and to the characters of reference marked thereon, which form a part of this specification.

This invention relates to apparatus for laying roadbeds and refers more specifically to improvements in that type of roadbed laying apparatus disclosed in the prior United States application of George W. Jackson, Serial Number 276,033, filed on February 6, 1919. Said apparatus embraces in general terms an assembling plate or support on which the roadbed units, as concrete slabs, are assembled, with means for forcing assembled units into their final positions relatively to other previously laid units, and for successively advancing the assembling support or plate in position to receive other courses of assembled units.

The present invention relates in part to means adapted to improve the mobile characteristics of the apparatus so that, with facility, it may be moved from place to place, to improved means for handling the slabs or units from which the roadbed is made, and bringing them to the assembling support or plate; to means for adapting the assembling support or plate to varying grades of the roadbed foundation, and to otherwise improve apparatus of this general type.

In the drawings herewith, which illustrate one practical embodiment of the invention:

Figure 1 is a plan view of the apparatus.

Fig. 2 is a side elevation thereof, with parts in section.

Fig. 3 is an enlarged plan view of the forward end of the apparatus, with parts omitted.

Fig. 4 is a vertical section on the line 4—4 of Fig. 1.

Fig. 5 is a like view, with parts in changed positions.

Figs. 6 and 7 are vertical sections on the lines 6—6 and 7—7 of Fig. 2.

Fig. 8 is a vertical section on the line 8—8 of Fig. 3.

Fig. 9 is a detail illustrating a modification hereinafter described.

Fig. 10 is a section on the line 10—10 of Fig. 9.

Fig. 11 is a modification of the means for carrying the road bed slabs or units.

As shown in said drawings, 15 designates the road foundation which is prepared in the usual or any preferred manner to receive the slabs or units 16, 17, which, when assembled, constitute the roadbed. Said units, preferably made of concrete at a central point of production, can be shipped to the field where they are to be laid on the prepared road foundation 15. The units are of such transverse dimensions that the units 16 of one course join overlappingly with those of adjacent courses or are staggered in respect thereto (Figs. 1 and 3). They are shaped to conform to the camber of the roadway, as best shown in Fig. 6, and preferably are provided on their side and end faces with interlocking tongues and grooves. The construction of said slabs or units is not herein fully detailed but may follow generally the construction shown in said Jackson application.

Referring to the features of construction embodying the present invention, it preliminarily may be stated in a general way that the present apparatus embodies, in addition to the assembling support or plate and the means for forcing the slabs or units home and advancing said support or plate, traction means, such as a caterpillar drive, which is adapted to draw the apparatus from place to place, and a trolley supporting frame to support carrying devices for the units or slabs, whereby the latter may be readily brought up to the slab assembling position of the device, said frame trailing behind the assembling support.

25, 25′ designate the elements of the assembling support in the form of relatively thin plates. They are hinged together in the manner hereinafter described to adapt the apparatus to the roadway foundation grades, and are made to approximate the width of the roadway to be laid and transversely shaped to conform to the camber of the road foundation 15. On the plate or support 25′ the roadbed units 16 and 17 are adapted to be successively assembled and to be subsequently forced rearwardly toward and in proper assembled position to the course last assembled in such a way that the assembling support is drawn forwardly from beneath the course last assembled in the same general manner as described in the aforesaid Jackson application. The said units or slabs are thus forced rearwardly and the assembling support is advanced by a suitable form of expansion means, such as the jacks illustrated, comprising a plurality of cylinders 26, that are fixed to the assembling support, and plungers 27 that are attached to or form part of pistons which reciprocate in said cylinders and are provided with bearers or heads 28 to engage the forward edges of the slabs or units in the manner best shown in Fig. 3. The said assembling support is of such length and the expansion jacks are so proportioned in respect to their strokes that when the plungers 27 are withdrawn into the cylinders 26, the trailing edge of the rear member 25' of the assembling support extends rearwardly from the bearers or heads 28 of said plunger a distance somewhat greater than the length of the roadbed slabs or units 16, 17, as best shown in Fig. 1, so that said trailing edge of the assembling support lies in underlapping relation to the course of slabs or units last laid. It will, therefore, be seen, with more particular reference to Fig. 4 that there is ample space on the assembling plate or support between the last laid course of units and the plunger heads or bearers 28 on which to lay the next course of roadbed units or slabs.

In order that the said assembling support may adapt itself to relatively sharp grades of the roadbed foundation 15, the two members of said support are transversely hinged to permit the forward end thereof to rise relatively to the rear end. In the form of device herein shown such hinge 30 occurs between the upper edges of transverse girders or flanges 31, 32 which are rigidly fixed to or integral with the members 25, 25' of the assembling support. The raising of the hinge 30 to a plane above the assembling support permits the front and rear portions of the assembling support to be hinged while at the same time avoiding breaking of the continuity of the support; it being practicable to permit the rear edge 33 of the rear portion of the member 25 to underlap the forward edge 34 of the trailing member 25' of the assembling support.

The forward end of the assembling support or plate 25 is shaped to constitute a tapered trimming edge 36 which is transversely curved to conform to the camber of the roadbed foundation and serves to cut away or trim the irregular face of the foundation to smooth it when the support is advanced to prepare the foundation for the units or slabs. The forward section 25 and as well also as the trailing section 25' of the assembling support are preferably formed at their sides with upstanding outwardly flaring walls or flanges 38, 38 and 39, 39, respectively, to strengthen the structure and to form the sides of the roadbed foundation.

In order that the apparatus may be readily moved from place to place and in order also that the assembling support may be readily withdrawn from the last assembled course of roadbed units, traction means are provided which are associated with the forward section or element 25 of the assembling support. Said traction means comprise, as herein shown, two pairs of caterpillar drives, designated as a whole by 45, the endless caterpillar members being trained about front and rear driving wheels 46, 47, respectively (Figs. 4 and 5), the axles 48 of which are supported in frame members 49 that are associated with slotted standards 50 which are fixed to or made integral with the member 25 of the assembling support. This construction is provided in order that the said shafts and also the caterpillar members may be raised and lowered relatively to the plane of the slab assembling support. To this end the forward member 25 of the support or plate is provided with parallel slots 52 (Fig. 3) through which the caterpillar elements are adapted to extend.

The means for thus raising and lowering the caterpillar elements comprise screw shafts 54 that are threaded in nuts 55 carried by the upper ends of the standards 50, and said shafts bear at their lower ends against the upper sides of the frames 49 in which the bearings for the axles 48 are mounted. Said screw shafts are provided with hand wheels 56 by which they may be turned to adjust the caterpillar elements to the plane of the assembling support. The caterpillar drive may be operated from any suitable power plant carried by the machine, as for instance, the explosion engines 60 supported on the caterpillar drive frame 61, and connected thereto in any suitable manner as by the transmission means suggested in Fig. 8. The particular driving connection from the motor to the caterpillar drive, however, constitutes in itself no portion of the present invention, and need not be further described.

The expansion jacks for assembling the roadbed units or slabs and for withdrawing the assembling support from beneath the last laid course of units may be operated by compressed air delivered from a tank 65 that is supplied from a pump 66 supported on a shaft 67 of the frame (Figs. 2, 4, and 5), said tank being connected to the cylinders 26 through pipe connections 70 provided with suitable controlling valves.

A further improvement disclosed in the present application resides in what may be termed a trailing frame designated as a whole by 75, on which are supported devices for carrying the slabs or units to the assembling position of the apparatus. The frame, as shown, embraces longitudinal girders 76, transverse beams 77, and standards 78, 79, all suitably fabricated and braced. The standards 79 are supported on the forward end of the assembling support by an upstanding portion 80 thereof, constituting a portion of the trimming nose 36. The other standards 100 are supported on rollers 81 that are adapted to travel on the laid roadway.

The said frame 75 supports a plurality of tracks 82, there being three herein shown, on which are mounted to travel trolleys, designated as a whole by 83, that support lifting cylinders 84 by which the slabs or units 16, 17 are adapted to be carried to the assembling position of the apparatus. Said lifting cylinders coöperate with plungers 85 whose pistons are adapted to reciprocate in said cylinders, and to the lower ends of which plungers are connected lifting arms 86 which may either be provided with hinged hooks 87 (Figs. 2, 4, and 6) to engage over the margins of the slabs or units, or, in lieu of the hooks, threaded bolts 88 may be swiveled to the arms 86 adapted to be threaded into the nuts 90 that are molded in said units 16, 17.

The trailing frame 75 will be made of considerable length and affords means whereby the road bed units 16, 17 may be conveniently delivered to the assembling position of the plate or support. As herein shown, and in connection with an assembling of the roadbed units that embraces three narrow units 16 and two wider units 17, the frame 25 is conveniently provided with three trolley tracks 82 which coöperate with the lifting cylinders 84 so that, by reason of the length of the trailing frame and of the fact that the units 16, 17 may be handled in different horizontal planes, the three roadbed unit handling devices may be operated full capacity at all times. Preferably and as shown, the forward ends of the tracks 82 are diverted laterally so as to bring the slabs or units properly over the assembling position of the apparatus. It will be understood that slabs or units may be pushed by hand forwardly toward the assembling space of the apparatus.

The motive power for the lifting cylinder 84 may be compressed air and furnished from the tank or receiver 65 through the valved flexible pipe connections 92, as best shown in Fig. 4. The said pipe connections 92 are flexible so as to permit movement of cylinders 84 toward and from receiver 65'. This detail in itself may be developed in any suitable manner and constitutes no part of the present invention.

In order that the apparatus may be leveled to conform to the grade of the road foundation, the several posts 78, 79 of the frame are provided with means whereby they may be vertically extended, as, for instance, by means of the screw jacks 98, 99 best shown in Figs. 2, 4, 5, and 6. With the arrangement shown the forward end or nose 36 of the assembling support may be raised through the action of the forward screw jacks 98, and the remainder of the frame may be leveled to accommodate the apparatus to the grade by the other screw jacks 99 of the road bed foundation. The said standards 78 with which the screw jacks 99 are associated are herein shown as supported and riding on rollers 100, by which the trailing portion of the frame is carried.

In lieu of these rollers, however, the runner supports may be employed. Preferably and as herein shown, the forward portion of the frame associated with the caterpillar drive is connected by draw bars or hitching links 101 with the trailing portion of the frame in rear of the slab assembling support.

In Figs. 9 and 10 means are shown for reinforcing the plungers 27 of the cylinders 26. Said reinforcing means comprise braces 102 that may be made integral with the heads or bearers 28 of said plungers 27, which braces extend diagonally forwardly and upwardly, and are formed with guide ribs 103 that engage grooves in channel members 104 that are fixed in any suitable manner to the cylinders 26 or the structures which carry the same.

What we claim as our invention is:

1. Apparatus for laying road beds comprising an assembling support transversely hinged to adapt it to varying road bed foundation grades on which road bed slabs are adapted to be assembled in courses, and means carried by said support for forcing a last laid course of slabs against a previously laid course.

2. Apparatus for laying road beds comprising an assembling support and road bed foundation trimming device, transversely hinged to adapt it to varying road bed foundation grades on which road bed slabs are adapted to be assembled in courses, and means carried by said support for forcing a last laid course of slabs against a previously laid course.

3. Apparatus for laying road beds comprising an assembling support and road bed foundation trimming device, transversely hinged to adapt it to varying road bed foundation grades on which road bed slabs are adapted to be assembled in courses, and means carried by said support for forcing a last laid course of slabs against a previously laid course.

4. Apparatus for laying road beds on which road bed slabs are adapted to be assembled in courses, and means carried by said support for forcing a last laid course of slabs against a previously laid course and for advancing the support over the roadway foundation, said support comprising two members, one formed with a roadway foundation trimming edge and the other having an assembling space, and means for hinging said members together in a plane above the plane of said support.

5. Apparatus for laying road beds on which road bed slabs are adapted to be assembled in courses, and means carried by said support for forcing a last laid course of slabs against a previously laid course and for advancing the support over the roadway foundation, said support comprising two members, one formed with a roadway foundation trimming edge and the other having an assembling space, and flanges rising from said support members and hinged together above the plane of said assembling support.

6. Road bed laying apparatus comprising a support spanning and resting on the road foundation on which road bed units are adapted to be assembled, power means to lay said units on a road foundation and to advance said support, and vertically adjustable traction means for said support.

7. Road bed laying apparatus comprising a support spanning and resting on the road foundation on which road bed units are adapted to be assembled, power means to lay said units on a road foundation and to advance said support, and traction means for advancing said support, said support being provided with openings and the traction means extending through said openings and being vertically adjustable relatively to said support.

8. Road bed laying apparatus comprising a support on which road bed units are adapted to be assembled, power means to lay said units on a road foundation and to advance said support, separate traction means for advancing said support, and means for raising and lowering the traction means relatively to said support.

9. Road bed laying apparatus comprising a support on which road bed units are adapted to be assembled, power means to lay said units on a road foundation and to advance said support, said support being provided with openings and caterpillar traction means extending through said openings for advancing said support independently of said power means, with means to vertically adjust the traction means relatively to said support.

10. Road bed laying apparatus comprising a support spanning and adapted to rest on and slide over the road bed and on which road bed units are adapted to be assembled, power means to lay said units on a road foundation and to advance said support, caterpillar traction means for advancing said support independently of said power means, and means for raising and lowering said caterpillar drive relatively to said support.

11. Apparatus for laying road beds comprising an assembling support adapted to span and rest and slide on the road foundation, said support comprising a forward member and a trailing member, with means to transversely hinge them to adapt the support to uneven roadbeds, means carried by the support for forcing a last laid course of road bed units against a previously laid course, and traction means connected to and vertically adjustable relatively to the forward member of the support for drawing the support forwardly.

12. Road bed laying apparatus comprising a support on which road bed units are adapted to be assembled, power means to lay said units on a road bed foundation and to advance said support, a frame partially carried by and trailing from said support, and means coöperating with the frame to carry the road bed units to the assembling position on said support.

13. Road bed laying apparatus comprising a support which spans and is adapted to rest on and slide over the road foundation on which road bed units are adapted to be assembled, power means to lay said units on a road bed foundation and to advance said support, a frame partially carried by the forward end of the support and trailing from said support, tracks supported on and extending longitudinally of the frame over said support, and road bed unit carrying means traveling on said tracks.

14. Road bed laying apparatus comprising a support spanning the road foundation and adapted to rest and slide thereon and on which road bed units are adapted to be assembled, power means to lay said units on a road bed foundation and to advance said support, a frame supported partially on the forward part of and trailing from said support, and means spaced along said frame for adjusting the frame to road bed foundation grades.

15. Apparatus for laying road beds comprising an assembling support adapted to span and rest and slide on the road foundation, said support comprising a forward member and a trailing member, with means to transversely hinge them to adapt the support to uneven roadways, means carried by the support for forcing a last laid course of road bed units against a previously laid course, a frame supported at its forward end on the front member of the support and extending over the rear member thereof trailing from the support, and means travelable in the frame to carry road bed units to the assembling position on said support.

16. Road bed laying apparatus comprising a support spanning and to rest and slide on the road bed foundation and on which road bed units are adapted to be assembled, power means to force assembled units therefrom on a road foundation and to advance said support, traction means to carry said support from place to place, a frame supported partially on said frame and trailing backwardly from said support over the assembling space on the support, and traveling means supported on said frame for carrying road bed units to said assembling space.

17. Apparatus for laying road beds comprising an assembling support adapted to span and rest and slide on the road foundation, said support comprising a forward member and a trailing member, with means to transversely hinge them to adapt the support to uneven roadways, means carried by the support for forcing a last laid course of road bed units against a previously laid course, traction means connected to and vertically adjustable relatively to the forward member of the support for drawing the support forwardly, and a frame partially supported on the forward member of said support and extending backwardly over the unit assembling space thereon and trailing from said support, with means travelable thereon to carry road bed units to said assembling space.

In testimony whereof we claim the foregoing as our invention, we hereunto append our signatures at Chicago, Illinois, this 12th day of April, 1919.

ROBERT E. RODGERS.
THOMAS C. JACKSON.